United States Patent [19]
Moriyama et al.

[11] Patent Number: 5,713,802
[45] Date of Patent: Feb. 3, 1998

[54] GOLF BALL HAVING TWO-LAYER COVER STRUCTURE

[75] Inventors: Keiji Moriyama; Masatoshi Yokota, both of Shirakawa; Satoshi Iwami, Himeji, all of Japan

[73] Assignee: Sumitomo Rubber Industries, Ltd., Hyogo-ken, Japan

[21] Appl. No.: 635,192

[22] Filed: Apr. 19, 1996

[30] Foreign Application Priority Data

Apr. 21, 1995 [JP] Japan .................................. 7-096681
Jul. 7, 1995 [JP] Japan .................................. 7-171863

[51] Int. Cl.$^6$ ............................................. A63B 37/12
[52] U.S. Cl. ..................... 473/374; 473/373; 473/354; 473/357; 473/365
[58] Field of Search ............................. 473/372, 373, 473/374, 354, 357, 365

[56] References Cited

U.S. PATENT DOCUMENTS

| | | | |
|---|---|---|---|
| 4,431,193 | 2/1984 | Nesbitt . | |
| 4,688,801 | 8/1987 | Reiter | 473/372 |
| 4,858,924 | 8/1989 | Saito | 473/373 |
| 4,919,434 | 4/1990 | Saito . | |
| 5,439,227 | 8/1995 | Egashira et al. | 473/373 |
| 5,556,098 | 9/1996 | Higuchi et al. | 473/373 |

FOREIGN PATENT DOCUMENTS

| | | |
|---|---|---|
| 2248067 | 3/1992 | United Kingdom . |
| 2278609 | 12/1994 | United Kingdom . |
| 2292387. | 2/1996 | United Kingdom . |

*Primary Examiner*—George J. Marlo
*Attorney, Agent, or Firm*—Birch, Stewart, Kolasch & Birch, LLP

[57] ABSTRACT

A two-layer cover structure having a hard inner layer and a soft outer layer, wherein the flight distance attained by using a driver or iron are increased and the ease of stopping the ball when making an approach shot is improved. The golf ball of the present invention comprises a core (1) and a cover formed on the core, wherein the cover has a two-layer cover structure of a hard inner cover layer (2) and a soft outer cover layer (3), and the inner cover layer (2) comprises a high-rigid polyamide resin present in an amount of not less than 5% by weight based on the total weight of the inner cover components.

9 Claims, 1 Drawing Sheet

GOLF BALL HAVING TWO-LAYER COVER STRUCTURE

FIELD OF THE INVENTION

The present invention relates to a golf ball. More particularly, it relates to a golf ball having a two-layer cover structure of a hard inner layer and a soft outer layer, wherein the flight distance obtained by using a driver or iron are increased and the ease of stopping the ball at the time of executing an approach shot is improved.

BACKGROUND OF THE INVENTION

In the prior art, there are mainly two kinds of golf balls. One golf ball is a solid golf ball (e.g. solid two-piece golf ball, etc) comprising a core of an integrated rubber member and a cover of a thermoplastic resin (e.g. ionomer resin, etc.) covered on the core. Another golf ball is a thread wound golf ball, which is produced by winding rubber thread around a solid or liquid center, followed by covering with a cover of an ionomer resin or balata having a thickness of 1 to 2 mm. The solid golf ball attains a large ball velocity at the time of hitting in comparison with the thread wound golf ball and, therefore, the trajectory referred to as a straight ball is obtained when using a driver or iron and the flight distance is longer. On the other hand, the solid golf ball attains a large ball velocity at the time of hitting and has small amount of spin because the contact area between the golf ball and hitting surface is small. Therefore, spin is not applied easily to the golf ball and thus the golf ball is not readily stopped on the green. Accordingly, a golf ball having excellent spin characteristics when using an iron while, at the same time, maintaining a large flight distance is desired. Accordingly, tests have been recently made using a soft resin for the outside of the cover layer (e.g. high-spin two-piece golf ball, etc.). When the outer cover layer is softened, the spin amount increases when hitting approach shots and thus the golf ball can be readily stopped. However, the ball velocity at the time of hitting is drastically reduced and the flight distance obtained using a driver or an iron is inferior to a conventional solid golf ball.

In order to accomplish the above object, Japanese Laid-Open Patent Publication No. 6-343718 tried to increase flight distance by using a high-acid ionomer resin for the inner cover layer in a golf ball having a multi-layer structure (comprising a ball center (core), an inner cover layer and an outer cover layer). Even if the hard (highly-rigid) high-acid ionomer resin is used for the inner cover layer, there is still a limitation on increase the ball velocity because of the use of a soft outer cover layer. It is thus necessary to make the inner cover layer harder, thereby increasing the ball velocity.

The present invention is directed to accomplishing the above objective. As a result, it has been found that, when using a polyamide resin in the amount of not less than 5% by weight based on the total amount of the resin of the composition in combination with an ionomer resin for the inner cover layer of the above-described golf ball having a two-layer cover structure, the resulting cover has a high rigidity and a high elasticity in comparison with the high-acid ionomer resins. It has also been found that, even if a soft ionomer resin having a stiffness of 1000 to 2500 kg/cm2 and a Shore-D scale hardness of 56 to 64, preferably 60 to 63 is used for the outer cover layer, a decrease in the rebound characteristics of the golf ball is avoided and the resulting golf ball is launched higher than a golf ball using a high-acid ionomer resin for the inner cover layer of the prior art, thereby increasing the flight distance of the golf ball while, at the same time, improving spin performances. Some golf balls of the prior art use a thermoplastic material containing a block copolymer of a polyamide for the inner cover layer (Japanese Laid-Open Patent Publication No. 4-244174). However, the polyamide used in the present invention is a simple substance i.e., a high-rigid random copolymer (a block copolymer may be mixed, partially), not a low-rigid block copolymer.

OBJECTS OF THE INVENTION

Thus, the main object of the present invention is to provide a golf ball having a two-layer cover structure of a hard inner layer and a soft outer layer, wherein the flight distance using a driver or an iron is increased and the ease of stopping an approach shot is improved.

This object as well as other objects and advantages of the present invention will become apparent to those skilled in the art from the following description with reference to the accompanying drawing.

BRIEF EXPLANATION OF THE DRAWINGS

The present invention will become more fully understood from the detailed description given hereinbelow and the accompanying drawings which are given by way of illustration only, and thus, are not limitative of the present invention, and wherein.

SUMMARY OF THE INVENTION

Figure 1:
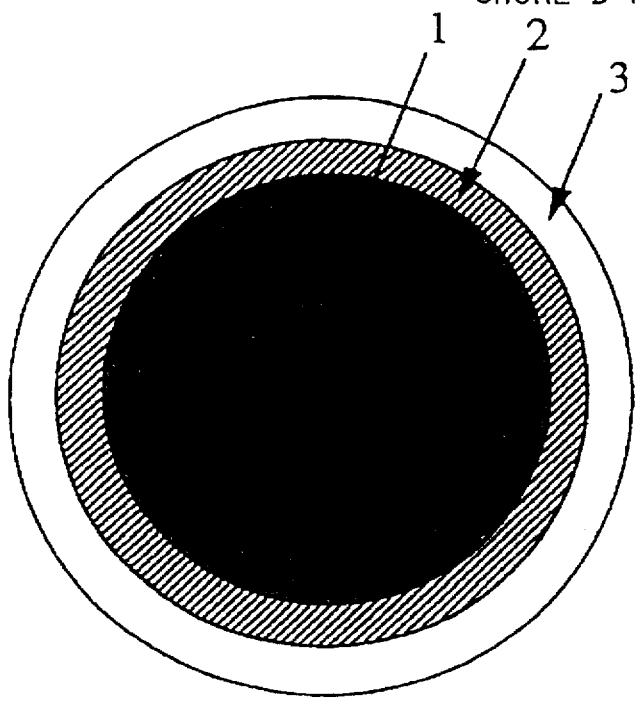
FIG. 1 is a schematic cross section illustrating the golf ball of the present invention.

The present invention provides a golf ball comprising a core (1) and a cover formed on the core, wherein the cover has a two-layer cover structure of a hard inner cover layer (2) and a soft outer cover layer (3), and the inner cover layer (2) comprises a high-rigid polyamide resin in an amount of not less than 5% by weight based on the total weight of the resin.

DETAILED DESCRIPTION OF THE INVENTION

Hereinafter, the present invention will be described in detail. In the golf ball of the present invention, cover layers (2 and 3) of a two-layer structure are formed on a core (1). The core may be a solid core for the above solid golf ball, or a thread core for the thread wound golf ball. The solid core includes a single layer core and a two-layer core. In case of the two-layer core, it is preferred that an inner nucleus has a diameter of 24 to 32 mm and a JIS-C hardness of 50 to 80 and a JIS C hardness of a jacket (referred to as outer nucleus, sometimes) covered on the inner nucleus is 10 larger than that of the inner nucleus. When a comparison between the two-layer core and single-layer core is made, the two-layer core is softer in feeling than the single layer at the same core hardness (deformation formed under load of 10 to 130 kg) and shows good rebound characteristics. The solid core is obtained by subjecting a rubber composition to vulcanization molding. A suitable rubber composition for a solid core comprises base rubbers (e.g. hi-cis polybutadiene, etc.), co-crosslinking agents (e.g. zinc (meth)acrylate, etc.), organic peroxides, fillers, etc. The solid or liquid center part for thread wound core is obtained by vulcanizing the same rubber composition as that of the solid core. As the liquid center, those obtained by enclosing a paste comprising viscosity adjustors, specific gravity adjustors and water in a bag are suitably used. The thread rubber to be wound around the center part is obtained by vulcanizing a natural rubber, synthetic isoprene rubber, etc. The core (1) generally has a diameter of 30 to 39, preferably from 33 to 37.5 mm. The core hardness (deformation formed when applying a load within the range from 10 to 130 kg) is preferably 3.7 to 5.0 mm. When it is smaller than 3.7, the hardness of the golf ball itself is large and the hit feeling is inferior (feel hard). On the other hand, when it is larger than 5.0, the rebound characteristics of the golf ball is lowered and the flight distance is decreased.

A conventional two-piece golf ball is obtained by covering a single-layer cover on the above core (1). Regarding the golf ball of the present invention, this cover has a two-layer structure which comprises an inner cover layer (2) and an outer cover layer. The inner cover layer (2) contains a polyamide resin in an amount of not less than 5% by weight, preferably from 5 to 50% by weight, based on the total amount of the inner cover resin components components. Examples of the polyamide resin include those comprising a polyamide skeleton as a main part, such as nylon 6, nylon 11, nylon 12, etc. A block copolymer wherein the other skeleton (e.g. polyester skeleton, etc.) is introduced in the polyamide skeleton shows a low rigidity because the skeleton to be introduced generally has a rigidity smaller than that of the polyamide, and thus is not preferred. The polyamide resin preferably has a stiffness of 10,000 to 18,000 kg/cm$^2$. As far as the stiffness is not within this range, a low-rigidity block copolymer may be formulated. The other resin component constituting the inner cover layer (2) is an ionomer resin, and examples thereof include known ionomer resins which are generally used for the cover of the golf ball. Examples of the ionomer resin include Hi-milan #1706 and #1707 (trade name) which are commercially available from Mitsui Polychemical Co., Ltd.), IOTEK 8000 which is commercially available from Exxon Co., etc. In the present invention, by using the ionomer resin in combination with a high-rigid polyamide resin, the resulting golf ball can attain the rigidity and elasticity which are higher than that of the conventional golf ball which uses a hard high-acid ionomer resin. The stiffness of the total inner cover is preferably from 4,000 to 8,000 kg/cm$^2$, more preferably from 5,000 to 8,000 kg/cm$^2$. It is preferred that the cover has a Shore-D scale hardness within the range of 65 to 90. The amount of the polyamide resin and ionomer resin is adjusted so that the stiffness and Shore D-scale hardness of the whole inner cover are satisfied. The formulation ratio by weight of both resins (polyamide resin/ionomer resin) which are practically used, varies largely depending on the kind of the resin used, for example, it is within the range of 5:95 to 70:30, preferably 10:90 to 60:40.

The resin component of the outer cover layer (3) comprises an ionomer resin, and examples thereof include known resins which are generally used for the cover of the golf ball. It is preferably a soft (low-rigid) ionomer resin having a stiffness of 1000 to 2500 kg/cm$^2$ and a shore-D scale hardness of 56 to 64, preferably 60 to 63. Examples thereof include Hi-milan #1650 and #1855 (trade name) which are commercially available from Mitsui Polychemical Co., Ltd. When the stiffness exceeds 2500 kg/cm$^2$, the spin characteristic is poor and an ease of stopping the ball on the green deteriorates. On the other hand, when it is smaller than 1000 kg/cm$^2$, the rebound characteristics of the golf ball itself deteriorate and the flight distance is sometimes decreased.

The cover layer (inner cover layer (2) and outer cover Layer (3)) in the present invention may contain, for example, colorants (e.g titanium oxide, etc.) and other additives such as ultraviolet absorbers, photostabilizers, fluorescent materials or fluorescent brighteners, etc. as long as the desired characteristics of the golf ball cover do not deteriorate.

The cover layer in the present invention is formed by known methods which are used for forming the cover of the golf ball, for example, injection molding, press molding, etc. Firstly, the inner cover (2) is covered on the core (1), and then the outer cover (3) is covered thereon. In case of covering the outer cover (3), a lot of recesses referred to as dimples are formed on the surface. The thickness of both outer and inner cover layers is preferably within the range of 0.5 to 2.3 mm. In order to enhance the appearance and commercial value, the golf ball of the present invention is generally placed on the market after coating with paint.

According to the present invention, there is provided a golf ball wherein the flight distance obtained by using the driver and an iron is increased and the ease of stopping the ball with approach shots is improved because the golf ball has a two-layer cover structure comprising the above-defined hard inner cover layer (2) and the soft outer cover layer (3).

The golf ball of the present invention is superior in hit feel and spin characteristics with an improved ease in stopping the ball on the green, (particularly, at the time of approach) while maintaining the essential flight distance of a solid golf ball.

EXAMPLES

The following Examples further illustrate the present invention in detail but are not to be construed to limit the scope thereof.

(i) Core formulation (The following core formulation was kneaded and then subjected to vulcanization molding to obtain a spherical core having a diameter of 35.5 mm φ).

| Component | Amount (parts by weight) |
| --- | --- |
| BR-18 (note 1) | 100 |
| Zinc acrylate | 26 |
| Zinc oxide | 29.9 |
| Antioxidant (note 2) | 0.5 |
| Dicumyl peroxide | 2.0 |
| Balnoc R (note 3) | 0.5 |

Core hardness: 4.3 mm
Vulcanizing conditions: 145° C., 35 minutes (ii) Inner cover layer formulation (Resins were blended in the following proportion to obtain the following stiffness. The resulting cover formulation was covered on the core obtained in the above item (i) in a thickness of 1.7 mm.)

| Component | Amount (parts by weight) | | | |
| --- | --- | --- | --- | --- |
| | A | B | C | D |
| AM7317 (note 4) | | | 50 | |
| AM7318 (note 4) | | | | 50 |
| Hi-milan #1706 (note 5) | 45 | 40 | | 50 |
| Hi-miian #1707 (note 5) | 45 | | | 50 |
| Nylon 12 (AMNO) | 10 | 20 | | |
| IOTEK 8000 (note 6) | | 40 | | |
| Stiffness (kg/cm$^2$) | 4350 | 5090 | 4300 | 3615 |
| Shore-D scale hardness | 67 | 69 | 67 | 65 |

(ii) Outer cover layer formulation (Resins were blended in the following proportion to obtain the following stiffness. The resulting cover formulation was covered on the cover obtained in the above item (ii) in a thickness of 1.9 mm.)

|              | Amount (parts by weight) | | |
| --- | --- | --- | --- |
| Component    | a    | b    | c    |
| Hi-milan #1650 (note 7) | 50 |  |  |
| Hi-milan #1855 (note 7) | 50 |  |  |
| Hi-milan #1601 (note 7) |  |  | 50 |
| Hi-milan #1702 (note 7) |  |  | 50 |
| Hi-milan #1706 |  | 50 |  |
| Hi-milan #1707 |  | 50 |  |
| Stiffness (kg/cm$^2$) | 1300 | 3615 | 2050 |
| Shore-D scale hardness | 60 | 65 | 61 |

(Note 1) Hi-cis-1,4-polybutadiene, manufactured by Japan Synthetic Rubber Co., Ltd.
(Note 2) Yoshinox 425, manufactured by Yoshitomi Seiyaku Co., Ltd.
(Note 3) Manufactured by Ohuchi Shinko Kagaku Co., Ltd.
(Note 4) High-acid ionomer resin, manufactured by Mitsui Polychemical Co., Ltd.
(Note 5) Ionomer resin, manufactured by Mitsui Polychemical Co., Ltd.
(Note 6) High-acid ionomer resin, manufactured by Exxon Co.
(Note 7) Ionomer resin, manufactured by Mitsui Polychemical Co., Ltd.
(Test results)

TABLE 1

|  | Example No. | | | Comparative Example No. | | |
| --- | --- | --- | --- | --- | --- | --- |
|  | 1 | 2 | 3 | 1 | 2 | 3 |
| Core formulation | 1 | 1 | 1 | 1 | 1 | 1 |
| Inner cover layer formulation (mm) | A | B | B | C | D | D |
| Outer cover layer formulation | 1.7 | 1.7 | 1.7 | 1.7 | 1.7 | 1.7 |
| Outer cover layer thickness (mm) | a | a | c | a | b | a |
| Spin amount (rpm) |  |  |  |  |  |  |
| Sand wedge | 1.9 | 1.9 | 1.9 | 1.9 | 1.9 | 1.9 |
| Driver | 6450 | 6400 | 6320 | 6200 | 4500 | 6100 |
|  | 2660 | 2580 | 2500 | 2790 | 2700 | 2810 |
| Driver flight distance (Carry) (yds) | 228.1 | 229.3 | 230.5 | 226.8 | 227.5 | 224.6 |
| Feeling | O | ⊚ | ⊚ | O | X[1] | X[2] |

[1] Hard
[2] Unsatisfied feeling

The driver flight distance is large in the order of Example 3, Example 2, Example 1, Comparative Example 2, Comparative Example 1 and Comparative Example 3. The driver flight distance increased by using the polyamide for the inner cover layer.

(Test method)

A golf ball produced by using a core, an inner cover layer and an outer cover layer having the following formulations shown in Table 1 was hit with a No. 1 wood club (i.e. driver, head speed: 45 m/second) or a sand wedge (head speed: 20 m/second), respectively, and the spin amount and driver flight distance were measured (device: swing robot, manufactured by True Temper Co., Ltd.).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A golf ball comprising a core and a cover formed on the core, wherein the cover has a two-layer structure of a hard inner cover layer and a soft outer cover layer, wherein the inner cover layer comprises a high-rigid polyamide resin which is present in an amount of not less than 5% by weight based based on the total weight of the inner cover components.

2. The golf ball according to claim 1, wherein the inner cover layer comprises a mixture of a polyamide resin and an ionomer resin.

3. The golf ball according to claim 1, wherein the soft outer cover layer cover comprises an ionomer resin having a stiffness within the range of 1000 to 2500 kg/cm$^2$.

4. The golf ball according to claim 1, wherein the hard inner cover layer has a Shore-D scale hardness of 60 to 99.

5. The golf ball according to claim 1, wherein the soft outer cover layer has a Shore-D scale hardness of 56 to 64.

6. The golf ball according to claim 5, wherein the soft outer cover layer has a Shore-D scale hardness of 60 to 63.

7. The golf ball according to claim 1, wherein the stiffness of the total inner cover is 4,000–8,000 kg/cm$^2$.

8. The golf ball according to claim 1, wherein the polyamide resin has a stiffness of 10,000 to 18,000 kg/cm$^2$.

9. The golf ball according to claim 1, wherein the polyamide resin is selected from the group consisting of nylon 6, nylon 11, and nylon 12.

* * * * *